United States Patent [19]
Bortnikov et al.

[11] Patent Number: 6,029,004
[45] Date of Patent: Feb. 22, 2000

[54] METHOD AND APPARATUS FOR MODULAR REORDERING OF PORTIONS OF A COMPUTER PROGRAM BASED ON PROFILE DATA

[75] Inventors: Vita Bortnikov; Bilha Mendelson, both of Haifa; Mark Novick, Jerusalem, all of Israel; Robert Ralph Roediger; William Jon Schmidt, both of Rochester, Minn.; Inbal Shavit-Lottem, Kibbutz Bet-Oren, Israel

[73] Assignee: International Business Machines Corporation, Armonk, N.Y.

[21] Appl. No.: 08/819,526

[22] Filed: Mar. 17, 1997

[51] Int. Cl.[7] .................................................. G06F 9/44
[52] U.S. Cl. .................... 395/709; 712/214; 712/226; 714/38
[58] Field of Search .................. 395/709, 704, 395/705, 183.14, 183.01, 390, 392, 380, 588, 580; 714/38, 37, 35; 712/214, 226, 227, 241, 233, 234, 216, 204

[56] References Cited

U.S. PATENT DOCUMENTS

| | | | |
|---|---|---|---|
| 4,847,755 | 7/1989 | Morrison et al. | 364/200 |
| 4,914,590 | 4/1990 | Loatman et al. | 364/419 |
| 4,947,315 | 8/1990 | Sokolow et al. | 364/200 |
| 5,014,185 | 5/1991 | Saito et al. | 364/188 |
| 5,021,945 | 6/1991 | Morrison et al. | 364/200 |
| 5,179,703 | 1/1993 | Evans | 395/700 |
| 5,193,180 | 3/1993 | Hastings | 395/575 |
| 5,212,794 | 5/1993 | Pettis et al. | 395/700 |
| 5,265,254 | 11/1993 | Blasciak et al. | 395/700 |
| 5,333,304 | 7/1994 | Christensen et al. | 395/575 |
| 5,335,344 | 8/1994 | Hastings | 395/575 |
| 5,355,487 | 10/1994 | Keller et al. | 395/650 |
| 5,412,799 | 5/1995 | Papadopoulos | 395/500 |
| 5,428,782 | 6/1995 | White | 395/650 |
| 5,428,793 | 6/1995 | Odnert et al. | 395/709 |

(List continued on next page.)

OTHER PUBLICATIONS

Pettis and Hansen, "Profile Guided Code Positioning", *Proceedings of the ACM SIGPLAN '90 Conference on Programming Language Design and Implementation*, Jun. 20–22, 1990, pp. 16–27.

"Program Restructing Technique for Improving Memory Management Performance", *IBM Technical Disclosure Bulletin*, vol. 39, No. 03, Mar. 1996, pp. 203–205.

Speer, S.E., et al., "Improving UNIX Kernel Performance using Profile Based Optimization", *1994 Winter USENIX*, Jan. 17–21, pp. 181–188.

Conte, T.M., et al., "Using Branch Handling Hardware to Support Profile–Driven Optimization", *International Symposium on Microarchitecture*, 27th, Nov. 30–Dec. 2, 1994, pp. 12–21.

(List continued on next page.)

*Primary Examiner*—James P. Trammell
*Assistant Examiner*—Tuan Q. Dam
*Attorney, Agent, or Firm*—Martin & Associates, L.L.C.; Derek P. Martin

[57] ABSTRACT

An apparatus and method reorder portions of a computer program in a way that achieves both enhanced performance and maintainability of the computer program. A global call graph is initially constructed that includes profile data. From the information in the global call graph, an intramodular call graph is generated for each module. Reordering techniques are used to reorder the procedures in each module according to the profile data in each intramodular call graph. An intermodular call graph is generated from the information in the global call graph. Reordering techniques are used to reorder the modules in the computer program. By reordering procedures within modules, then reordering the modules, enhanced performance is achieved without reordering procedures across module boundaries. Respecting module boundaries enhances the maintainability of the computer program by allowing a module to be replaced without adversely affecting the other modules while still providing many of the advantages of global procedure reordering.

42 Claims, 5 Drawing Sheets

U.S. PATENT DOCUMENTS

| | | | |
|---|---|---|---|
| 5,450,586 | 9/1995 | Kuzara et al. | 395/700 |
| 5,465,258 | 11/1995 | Adams | 395/700 |
| 5,485,616 | 1/1996 | Burke et al. | 395/709 |
| 5,517,628 | 5/1996 | Morrison et al. | 395/375 |
| 5,522,036 | 5/1996 | Shapiro | 395/183.14 |
| 5,535,329 | 7/1996 | Hastings | 395/183.11 |
| 5,539,907 | 7/1996 | Srivastava et al. | 395/700 |
| 5,555,417 | 9/1996 | Odnert et al. | 395/707 |
| 5,606,698 | 2/1997 | Powell | 395/709 |
| 5,689,712 | 11/1997 | Heisch | 395/704 |
| 5,787,284 | 7/1998 | Blainey et al. | 395/701 |
| 5,797,012 | 8/1998 | Blainey et al. | 395/705 |
| 5,797,013 | 8/1998 | Mahadevan et al. | 395/709 |
| 5,812,854 | 9/1998 | Steinmetz et al. | 395/709 |

OTHER PUBLICATIONS

Youfeng, W, et al., "Static Branch Frequency and Program Profile Analysis", *International Symposium on Microarchitecture,* 27th, Nov. 30–Dec. 2, 1994, pp. 1–11.

Balasa, F., et al., "Transformation of Nested Loops with Modulo Indexing to Affine Recurrences", *Parallel Processing Letters,* vol. 4, No. 3 (Sep. 1994), pp. 271–280.

Kishon, A., et al., "Semantics Directed Execution Monitoring", *J. Functional Programming,* vol. 5, No. 4, Oct. 1995, pp. 501–547.

Conte, T.M., et al., "Hardware–Based Profiling: An Effective Technique for Profile–Driven Optimization", *International Journal of Parallel Programming,* vol. 24, No. 2, Apr. 1996, pp. 187–206.

"Statics Gathering and Analyzing Tool for Open Software Foundation's Distributed Computing Environment", *IBM Technical Disclosure Bulletin,* vol. 37, No. 02B, Feb. 1994, pp. 215–217.

METHOD AND APPARATUS FOR MODULAR REORDERING OF PORTIONS OF A COMPUTER PROGRAM BASED ON PROFILE DATA

RELATED APPLICATIONS

This application is related to the following co-pending patent applications: "Method and Apparatus for Reordering Procedures in a Computer Program Based on Profile Data", Ser. No. 08/820,735, filed Mar. 19, 1997; and "Method and Apparatus for Profile-Based Reordering of Program Portions in a Computer Program", Ser. No. 08/814,527, filed Mar. 10, 1997.

BACKGROUND OF THE INVENTION

1. Technical Field

This invention generally relates to computer systems. More specifically, this invention relates to a method and apparatus for reordering the packaging of procedures within a computer program.

2. Background Art

The development of the EDVAC computer system in 1948 is generally considered the beginning of the computer era. Since that time, dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers and linkers take the human-readable form of a computer program, known as "source code", and convert it into "machine code" or "object code" instructions that may be executed by a computer system. Because a compiler and its associated linker generate the stream of machine code instructions that are eventually executed on a computer system, the manner in which the compiler and linker package procedures within the computer program affects the performance of the computer program.

In particular, the ordering of procedures within a computer program affects the performance of the memory paging system in a computer system. Nearly all computer systems have auxiliary storage, such as a hard disk drive, that has large storage capacity, and is relatively inexpensive yet slow compared to main memory. Main memory is typically comprised of Random Access Memory (RAM), which has a much smaller storage capacity and is more expensive than primary storage, yet it is very fast. Instructions and data are typically moved between primary storage and main memory in "pages." A "page" consists of a predefined number of bytes (typically a power of two), and is the fundamental unit of transfer between primary storage and main memory. A predetermined number of pages are typically set aside in main memory for storing pages as they are moved between auxiliary storage and main memory. When a processor within a computer system begins executing a computer program, the memory paging system fills the portion of main memory allocated to paging with pages from primary storage. When the processor needs data that is not in any of the pages in main memory, the memory paging system selects one or more pages that are replaced by new pages from primary storage. Swapping pages in and out of memory requires time and system resources, and therefore degrades system performance. In other words, the fewer the number of page swaps, the better.

In order to optimize the performance of modern computer programs, profilers have been developed to predict and/or measure the run-time behavior of a computer program. Profilers typically generate profile data that estimates how often different portions of the computer program are executed. Using profile data, a compiler, a linker, or a separate optimizer program may make decisions regarding the preferred order of procedures within the computer program in order to improve the performance of the computer system.

Known prior art systems generate profile data that is used by a linker to determine the order of all procedures within a computer program. For many sophisticated computer programs, such as operating systems, the size of the computer program is quite large, consisting of numerous modules. A module is a subset of a computer program that may be independently compiled (i.e., compiled separately from the rest of the modules). A module generally has one or more procedures. While reordering all of the procedures in a computer program may produce a near-optimal arrangement of procedures, it has a negative effect on the maintainability of the computer program. For example, when a problem or "bug" is discovered in the computer program, the bug needs to be fixed with a minimum of disruption to the rest of the computer program. Likewise, when an enhancement is made to the computer program, there needs to be a way to easily add the enhancement. Ideally, a small portion of the computer program (e.g., one or more modules) may be changed to fix the bug or to add the enhancement. However, replacing one or two modules may be problematic if the procedures within the replaced module have been packaged among procedures in many other modules.

If the procedures in a computer program have been interspersed across module boundaries, the most common way to assure the correct operation of the computer program is to supply an entire new program when a bug is fixed or an enhancement is made. However, in the case of large programs like operating systems, the prospect of sending out the entire program each time a bug fix is needed (or an enhancement is made) is prohibitively expensive. In addition, for some computer programs (again, like operating systems), the program needs to continue running while the updated modules are added. Shipping the entire program would require the computer system to be shut down while the new computer program is loaded, an untenable solution in many circumstances. Faced with these issues and with prior art solutions, there exist two primary options: 1) allow global procedure reordering, which makes maintenance difficult but enhances the performance of the code; or 2) forego the advantages of global procedure reordering so that procedures stay in the modules where they are created, making maintenance easier at the cost of slower execution time for the code. Without improved apparatus and methods for the reordering of procedures in a computer program based on profile data in a way that allows maintainability of the computer program, the computer industry will continue to suffer from this undesirable tradeoff.

DISCLOSURE OF INVENTION

An apparatus and method reorder portions of a computer program in a way that achieves both enhanced performance and maintainability of the computer program. A global call graph is initially constructed from profile data. From the information in the global call graph, an intramodular call graph is generated for each module. Reordering techniques are used to reorder the procedures in each module according to the profile data in each intramodular call graph. An intermodular call graph is generated from the information in the global call graph. Reordering techniques are used to reorder the modules in the computer program. By reordering procedures within modules, then reordering the modules, enhanced performance is achieved without reordering procedures across module boundaries. Respecting module boundaries enhances the maintainability of the computer program by allowing a module to be replaced without adversely affecting the other modules while still providing many of the advantages of global procedure reordering.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to optimization of a computer program using profile data. For those that are not experts in the field, the Overview section below provides general background information that will be helpful in understanding the concepts of the invention.

OVERVIEW

Optimizations Using Profile Data

Many modern software development environments include a profiling mechanism that uses information collected about a program's run-time behavior (known as profile data) to improve optimization of that program. "Profile data" as used herein means any estimates of execution frequencies in a computer program, regardless of how the estimates are generated. Profile data may be generated in a number of different ways. One way of generating profile data is to perform a static analysis of the program code to estimate the execution frequencies of procedures in the computer program. Other methods are known that dynamically collect information about a computer program as it runs.

One type of dynamic profiler is known as a sampling profiler. A sampling profiler uses a hardware timer to periodically wake up a process that records the address of the currently executing instruction.

A second type of dynamic profiler is known as a trace-based profiler, which collects an execution trace of all the instructions executed by the computer program. An execution trace is a map that shows the addresses that were encountered during program execution. The profiler then reduces this information to a manageable size to determine how often each procedure in the computer program was called.

A third type of dynamic profiler is known as an instrumenting profiler. An instrumenting profiler recompiles the computer program and inserts special instrumentation code known as "hooks" at important points in the computer program (such as procedure calls). As the instrumented program executes, these hooks cause data counters to be incremented, recording the procedure call history information directly as the computer program runs. The counters contain profile data that is then used to determine how often each procedure in the computer program was called.

Procedure Reordering

Modern compilers typically group instructions into groups known as "basic blocks". The term "basic block" is well known in the art, and represents a maximal sequence of straight-line code. A procedure in a computer program typically includes many basic blocks. A module, or compilation unit, in a computer program includes one or more procedures that are compiled at the same time. The computer program is defined by a hierarchy of modules, procedures, and basic blocks. Once the computer program is defined by a particular hierarchy, certain profile-based optimizations may be performed to enhance the performance of the computer program.

One important profile-based optimization is procedure reordering, which analyzes the most frequently executed paths among procedures in a computer program, and uses this information to reorder the procedures within the module or computer program of interest. The primary purpose of this reordering is to improve memory paging performance.

The performance of the memory paging system depends on the ordering of procedures, as illustrated by the extremely simplified example below. Procedure A, which has 500 bytes, is initially packaged at the beginning of the module. Procedure B, which has 1200 bytes, is initially packaged at the end of the module. There are numerous procedures in between A and B that have a total of 15,000 bytes. Assume the page size is 1,000 bytes and that the memory paging system brings in two pages at a time and can store a total of ten pages. Assume that A is aligned at the first byte of the module, and that other procedures have been executed prior to A (to assure the memory paging system has filled all of the pages). When the memory paging system sees that the processor needs to access A, it will swap two of the pages already in memory for the two pages that include procedure A. These two pages include procedure A and 1,500 bytes of other procedures. When the processor has finished executing A, assume that B needs to be executed, but B is not in memory. The memory paging system must bring in the pages that contain procedure B. Note that procedure B may occupy two or three pages depending on where the page boundaries fall. For example, if B has its first 100 bytes on one page, its next 1000 bytes on a second page, and its last 100 bytes on a third page, it would span three pages. If procedure B spans three pages, the memory paging system would have to bring in four pages into the main memory, since it brings in two pages at a time. In this example, the initial packing order of A and B results in the memory paging system performing a total of six page swaps to execute A and B. Note, however, that if B were packaged immediately after A, both A and B (total of 1,700 bytes) would be brought in with the first two page swaps to bring in A, reducing the number of page swaps from six to two. This example illustrates how the packaging order of procedures in a computer program can affect performance of the computer system.

Effectively reordering procedures requires an understanding of call graphs. A call graph is a graph consisting of one node for each procedure in the program portion of interest.

In an undirected call graph (that ignores the direction of the call), there is an arc between procedure A and procedure B if either one calls the other. In a directed call graph, there is an arc from A to B if procedure A calls procedure B. In such a case, A is said to be a predecessor of B, B is said to be a successor of A, and the arc A-B is said to be incident to procedures A and B.

A call graph can be "weighted" with estimates of execution frequencies. These estimates are often obtained using profile data from sample executions of the computer program, but other methods of estimating execution frequencies are possible. For example, some compilers try to provide rough estimates by static analysis of the computer program. Such estimates are generally not as accurate as those obtained by dynamic profiling, but can be generated without the overhead of dynamic profiling. Weights may be assigned to procedures or to the arcs between them in a call graph. A weight given to a procedure indicates how frequently that procedure is called, whereas a weight given to an arc A-B indicates how frequently procedure A calls procedure B.

One known method for reordering procedures in a computer program based on profile data is disclosed in U.S. Pat. No. 5,212,794 "Method for Optimizing Computer Code to Provide More Efficient Execution on Computers Having Cache Memories", issued May 13, 1993 to Pettis et al. and assigned to Hewlett-Packard Co. The applicable method is described in column 8, line 56, through column 10, line 48 of the Pettis et al. patent. The Pettis et al. method uses a coalescing approach to reorder procedures in a computer program.

Other methods for reordering procedures have also been developed. Several such methods are disclosed in the related co-pending patent application entitled "Method and Apparatus for Reordering Procedures in a Computer Program Based on Profile Data," Ser. No. 08/820,735, filed Mar. 19, 1997. In the first embodiment of this related patent application, procedures are reordered by constructing traces of maximal length in both directions from an initial block that is the block with the greatest weight in the call graph. In the second embodiment of this related patent application, procedures are reordered by constructing traces, adding predecessors and successors to the trace if they are perfect partners with the current block in the trace. In the third embodiment of the related patent application, when a new trace is started, the initial procedure is preferred to be a procedure that touches the last trace. The method for reordering procedures according to Pettis et al. and according to the methods disclosed in the related application cited above are all viable ways of reordering procedures within a computer program.

The remainder of this specification discloses an apparatus and various methods for reordering procedures in a module within a computer program and between modules in a computer program in a way that allows one module to be replaced without affecting the ordering of procedures in the remaining modules.

DETAILED DESCRIPTION

Profile data may be generated in any of the methods discussed above, or may be generated by new methods in the future. The present invention uses profile data in a call graph to reorder procedures in a portion of a computer program, without regard to how the profiling data was generated.

Figure 1:
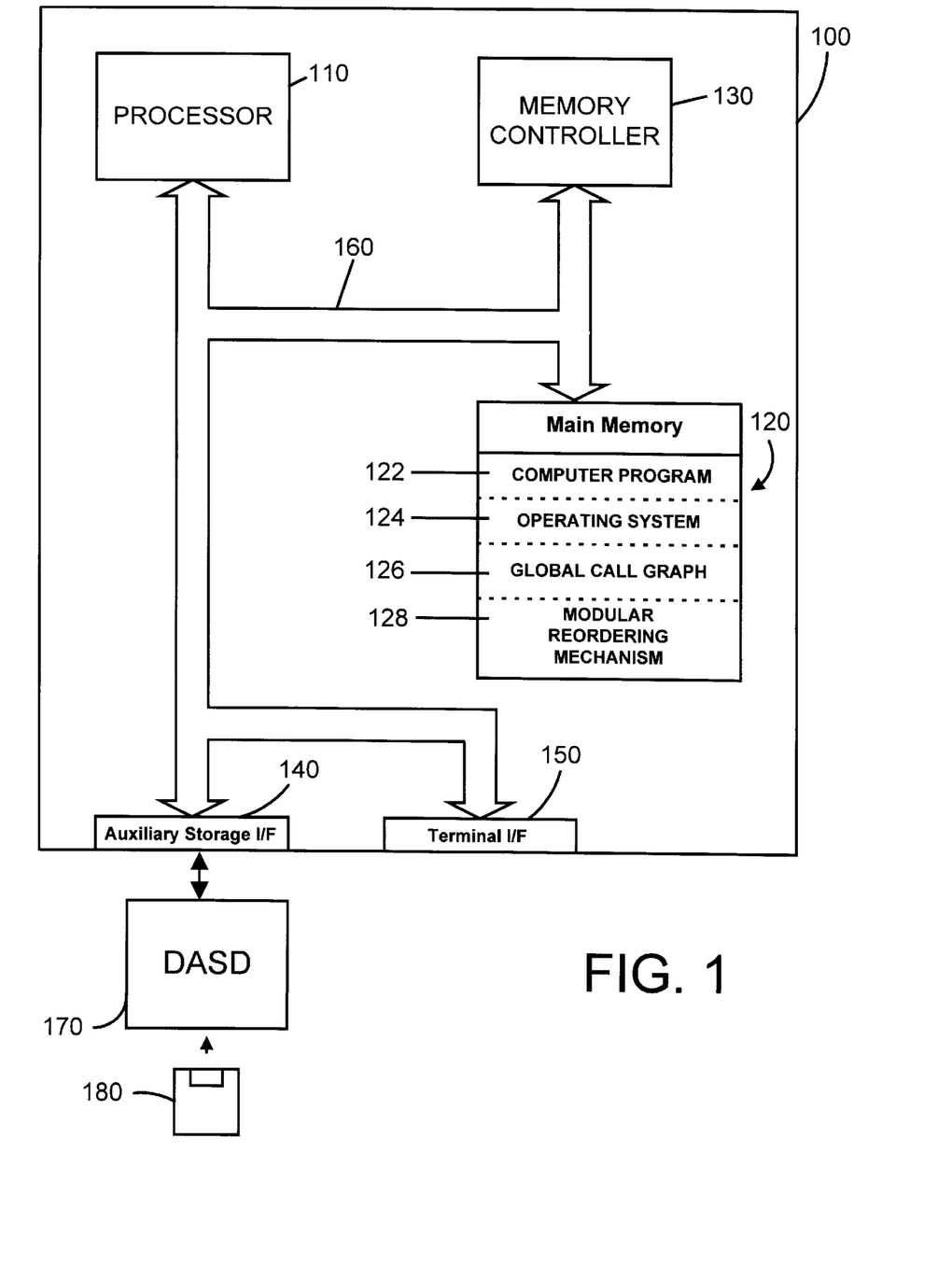
FIG. 1 is a block diagram of a computer apparatus in accordance with the present invention.

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a computer program 122 within main memory 120.

Auxiliary storage interface 140 is used to allow computer system 100 to store and retrieve information from auxiliary storage, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. Note that a modular reordering mechanism in accordance with the present invention may exist as a program product on one or more floppy disks 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media employed to actually carry out the distribution. Examples of signal bearing media include: recordable type media such as floppy disks (e.g., disk 180) and CD ROMS, and transmission type media such as digital and analog communication links.

Memory controller 130, through use of a processor separate from processor 110, is responsible for moving requested information from main memory 120 and/or through auxiliary storage interface 140 to processor 110. Memory controller 130 performs the functions of the memory paging system, swapping pages from DASD 170 to main memory 120 as required. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication could be used.

Main memory 120 contains one or more computer programs 122, an operating system 124, a global call graph 126, and a modular reordering mechanism 128. In the preferred embodiment, modular reordering mechanism 128 may be part of an optimizing compiler, may be part of a linker, or may be part of a separate post-pass processing program. Computer program 122 in memory 120 is used in its broadest sense, and includes any and all forms of computer programs, including source code, intermediate (i.e., relocatable) code, machine code, and any other representation of a computer program that has procedures that could be reordered. Global call graph 126 includes profile data that estimates execution frequencies of procedures within computer program 122. Global call graph 126 preferably includes all procedures within a computer program 122. Profile data within global call graph 126 may be generated using static analysis, dynamic profiling, or any other method for estimating execution frequencies for the procedures within computer program 122. Once generated, the profile data is stored in main memory 120 as part of the global call graph 126.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, if modular reordering mechanism 128 is part of an optimizing compiler, the compiler may generate a machine code instruction stream from computer program 122 that is intended to be executed on a different computer system if the optimizing compiler is a cross-compiler. The methods and apparatus discussed herein apply to all types of compilers, including cross-compilers.

Figure 2:
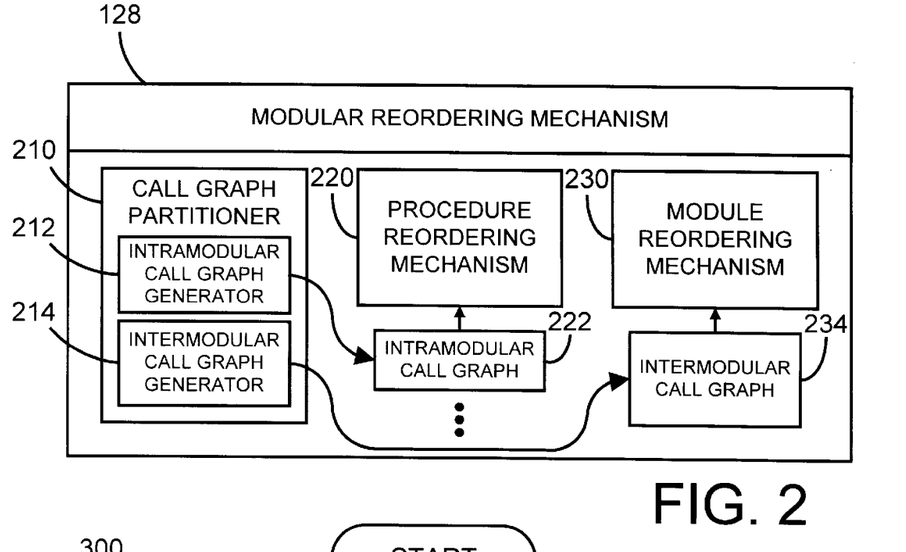
FIG. 2 is a block diagram of the modular reordering mechanism of FIG. 1.

Referring to FIG. 2, modular procedure reordering mechanism 128 includes a call graph partitioner 210, a procedure reordering mechanism 220, and a module reordering mechanism 230. Call graph partitioner 210 includes an intramodular call graph generator 212 and an intermodular call graph generator 214. Intramodular call graph generator 212 generates one or more intramodular call graphs 222, preferably one intramodular call graph 222 per module in the computer program 122. Intermodular call graph generator 214 generates an intermodular call graph 234. The functions of these generators 212 and 214 is discussed in more detail below with reference to FIGS. 5 and 6.

Procedure reordering mechanism 220 takes profile data in an intramodular call graph 222 (produced by intramodular call graph generator 212) that corresponds to a selected module, and reorders procedures within the module. Procedure reordering mechanism 220 preferably reorders the procedures in each module within the computer program 122 (and therefore uses profile data in many intramodular call graphs), but it is also anticipated within the scope of the present invention that procedure reordering mechanism 220 may reorder the procedures only within selected modules. Any method may be used to reorder the procedures in a module within the scope of the invention. For example, the coalescing method that uses an undirected call graph as taught in the Pettis et al. patent (discussed in the Overview section) could be adapted to provide one suitable method for reordering procedures within a module, even though the Pettis et al. disclosure is specifically addressed to procedure reordering in the entire computer program by a linker. Other suitable examples of reordering methods are disclosed in the related co-pending patent application entitled "Method and Apparatus for Reordering Procedures in a Computer Program Based on Profile Data," Ser. No. 08/820,735, filed Mar. 19, 1997. Regardless of the particular reordering method used, whether now known or developed in the future, the present invention extends to any and all methods for reordering procedures within a selected module in a computer program using profile data in an intramodular call graph.

Each intramodular call graph 222 comprises a subgraph of the global call graph 126 that contains information for procedures within a single module. Each intramodular call graph 222 provides profile data regarding which procedures are called by other procedures within a module, but no calls outside of the module are represented. Intramodular call graph 222 thus provides profile data which allows procedure reordering mechanism 220 to appropriately reorder procedures within module boundaries.

Procedure reordering mechanism 220 is preferably implemented in a compiler or in a separate software tool that performs post-pass processing and optimization of the computer program. A compiler must order procedures in a module when it compiles the module, so optimizing the procedure ordering when the module is initially compiled saves the time and effort of reordering later. However, in some circumstances, a post-pass processing tool may be preferable for ordering procedures within modules. For example, if many different programmers are developing different modules of a computer program using different compilers, a post-pass processing tool could reorder the procedures within each module in one place, rather than building in a procedure reordering mechanism into each different compiler.

Module reordering mechanism 230 uses profile data in an intermodular call graph 234 (generated by intermodular call graph generator 214) that preferably includes all of the modules in computer program 122, but could include a subset of the modules as well. Module reordering mechanism 230 reorders modules within computer program 122 to determine the packaging order of the modules. Module reordering mechanism 230 preferably uses the same reordering method for reordering modules that procedure reordering mechanism 220 uses for reordering procedures. In the alternative, module reordering mechanism 230 may use a different reordering method.

Each intermodular call graph 234 comprises a subset of the global call graph 126 that contains profile data regarding which procedures in which modules are called by procedures in other modules. No information regarding procedure calls within a module is present, because this information was previously presented in the intramodular call graphs 222 corresponding to each module and taken into account when reordering the procedures within each module. Intermodular call graph 234 thus provides profile data which allows module reordering mechanism 230 to determine the best ordering of modules in the computer program based on the procedure calls between modules.

Module reordering mechanism 230 is preferably implemented in a linker or in a separate software tool that performs post-pass processing and optimization of the computer program. If performed by a linker, the reordering need not be performed again at a later stage. However, in certain circumstances (e.g., if it is not feasible to modify the linker because the linker code is inaccessible), module reordering by a post-pass processing tool may be the more attractive option.

The reordering mechanism 128 is modular because it divides the computer program up into modules, reorders procedures within those modules, then reorders the modules themselves. Thus, reordering is being performed at two distinct levels of granularity. When procedure reordering mechanism 220 and module reordering mechanism 230 use the same reordering method, it is possible to use similar code or even the same code to perform both reorderings. Note that this reordering scheme may be extended to finer or coarser levels of granularity within the scope of the present invention. For example, the intramodular call graph generator could generate call graphs consisting of multiple modules, rather than a single module, or could generate multiple call graphs from a single module. Those skilled in the art will recognize that these and other variations are possible within the scope of the present invention.

Figure 3:
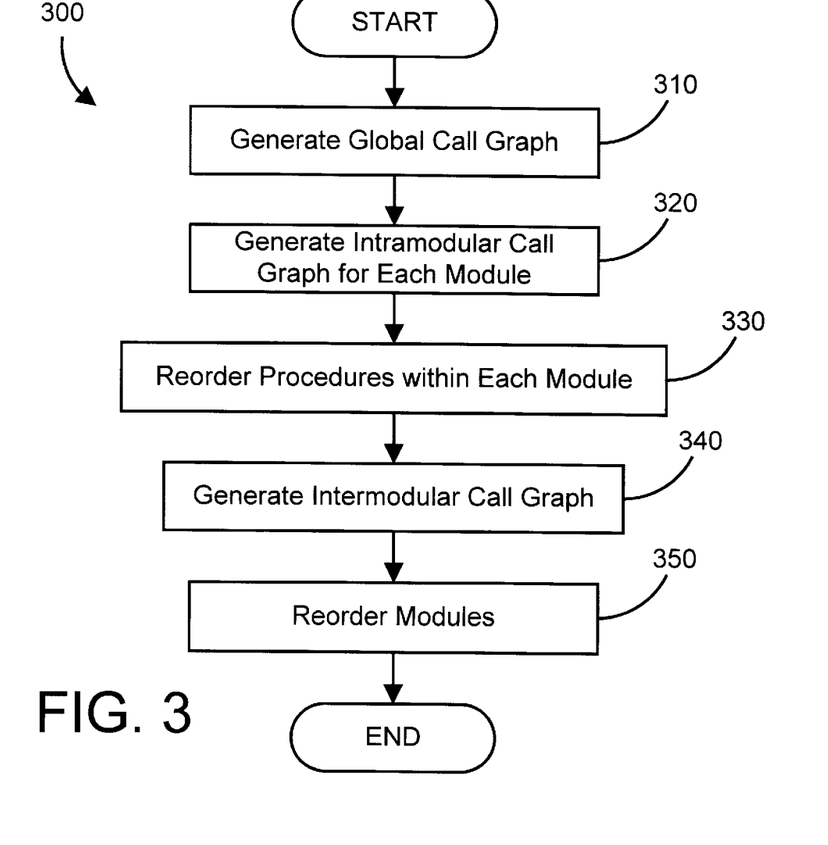
FIG. 3 is a flow diagram of a method for modular reordering of a computer program in accordance with the present invention.

Referring to FIG. 3, a method 300 for modular reordering of program portions in a computer program begins by generating a global call graph 126 (step 310). The global call graph 126 is generated from profile data that estimates the execution frequency for procedures within computer program 122. As discussed above, this profile data may be statically or dynamically generated, and may be appropriately weighted to arrive at the estimates of execution frequencies. Method 300 then generates an intramodular call graph 222 for each module (step 320), and reorders the procedures within each module (step 330). Note that the reordering within each module respects the module boundaries. This assures that if a module needs to be replaced due to an enhancement or bug fix, it may be replaced without affecting procedures in other modules.

Method 300 then generates an intermodular call graph 234 (step 340), and reorders the modules within the computer program (step 350). The reordering of modules preferably includes all modules in the computer program in the preferred embodiment, but reordering fewer than all modules is also anticipated by the present invention.

In FIG. 3, the generation of the intramodular call graph (step 320) and the intermodular call graph (step 340) is shown following the generation of the global call graph (step 310). Note, however, that steps 320 and 340 may generate their respective call graphs directly from profile data, without first constructing a global call graph.

Figure 4:
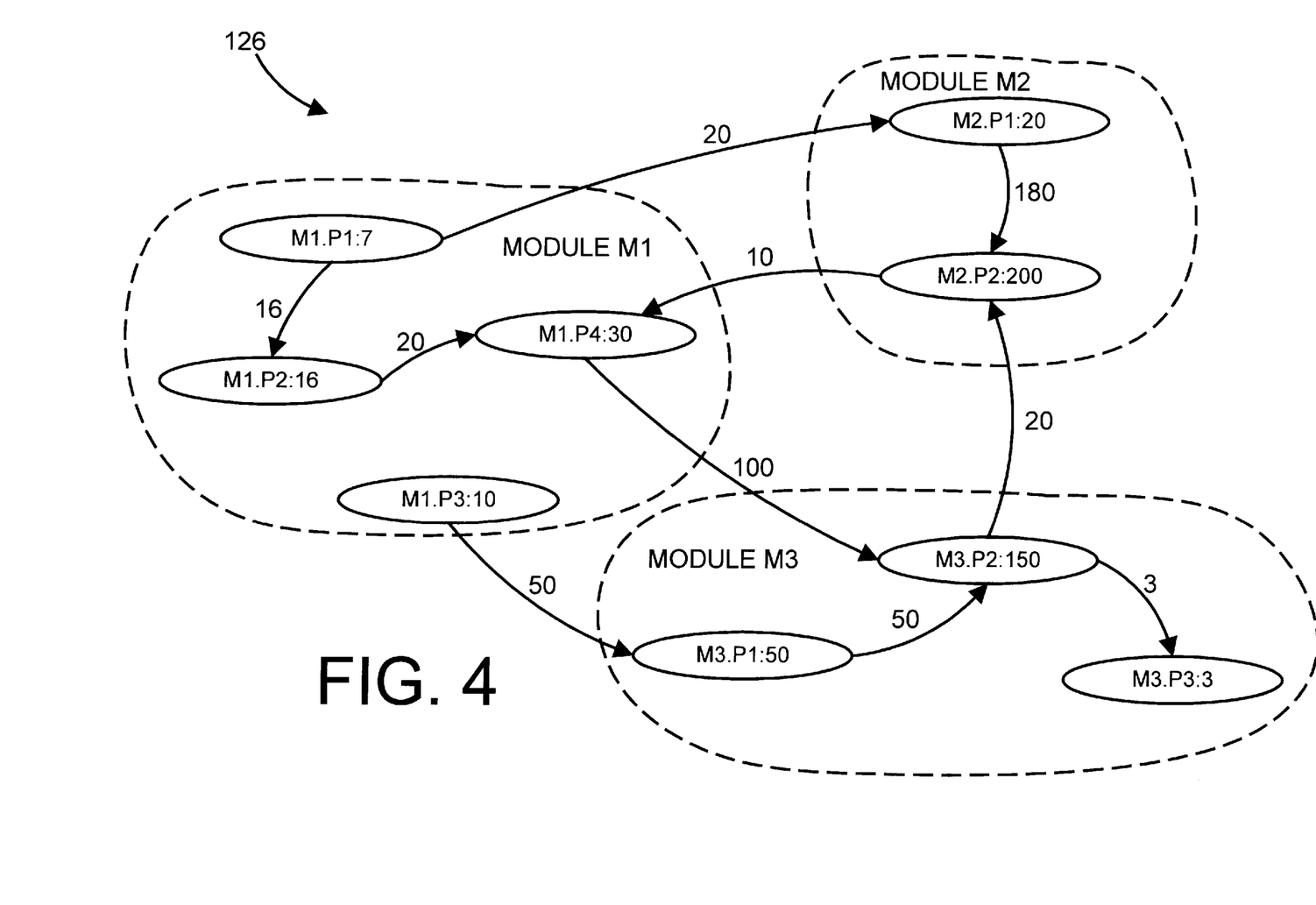
FIG. 4 is a global graph for a sample computer program.
Figure 5:
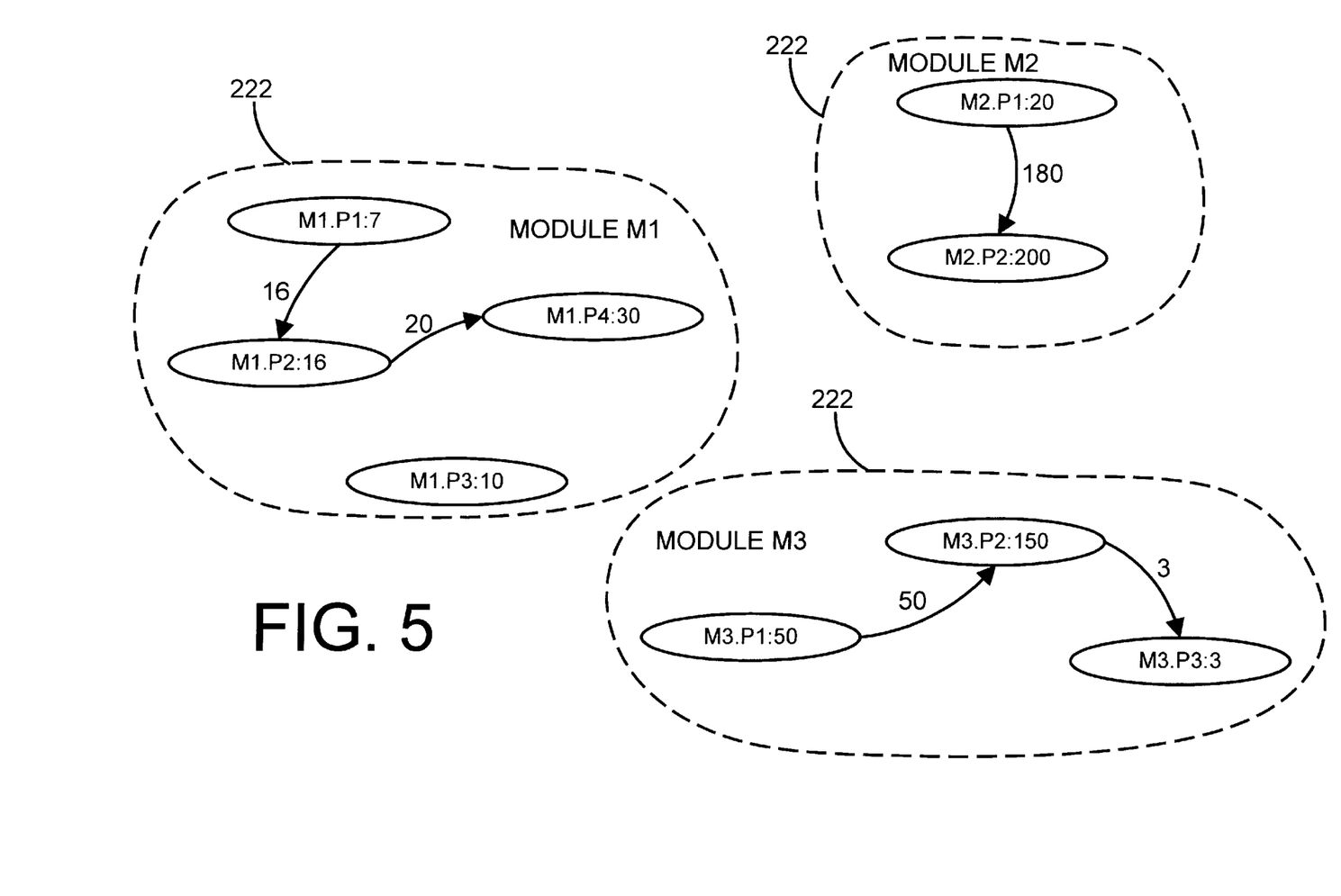
FIG. 5 is an intermodular call graph for a sample computer program represented by the global call graph of FIG. 4.
Figure 6:
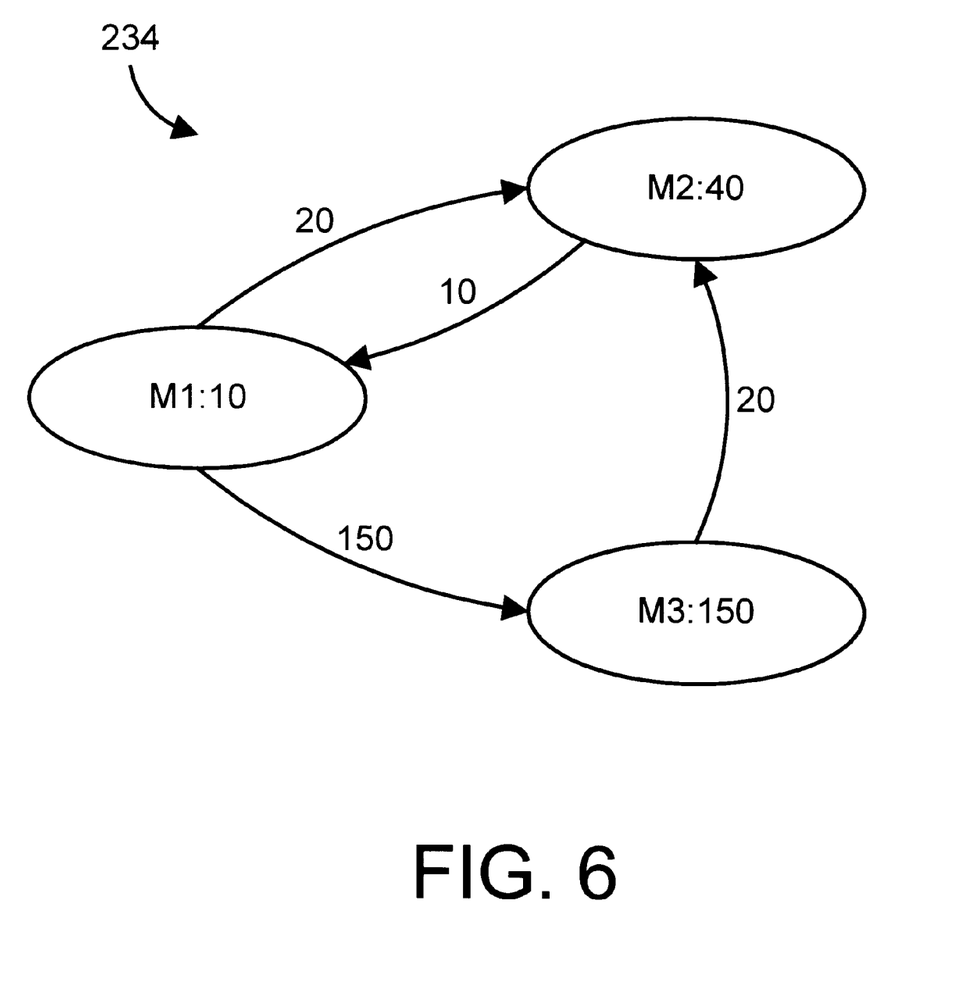
FIG. 6 is an intermodular call graph for a sample computer program represented by the global call graph of FIG. 4.

The steps of method 300 may best be understood with reference to the graphs of FIGS. 4–6. A sample global call graph 126 is shown in FIG. 4, which is generated in step 310 (FIG. 3). The computer program depicted by this global call graph 126 includes: a first module M1 that has four procedures M1.P1, M1.P2, M1.P3, and M1.P4; a second module M2 that includes two procedures M2.P1 and M2.P2; and a third module M3 that includes three procedures M3.P1, M3.P2, and M3.P3. An arc going from a first procedure to a second procedure depicts that the first procedure calls the second procedure. For example, in global call graph 126 of FIG. 4, M1.P1 calls M2.P1. The weights of the arcs represent the number of times the call is made, so M1.P1 calls M2.P1 20 times. The presence and weight of arcs in the global call graph 126 are derived from profile data that estimates execution frequencies for procedures within the computer program. The weights of procedures are estimates of the total number of times each procedure is called, which equals the sum of the weights of arcs leading to a procedure. For example, in global call graph 126 of FIG. 4, procedure M1.P4 has a weight of 30, which is the sum of the weights of arcs leading to that procedure.

Once global call graph 126 has been generated, the profile data therein can be used to generate an intramodular call graph for each module in the computer program (step 320). Call graph partitioner 210 uses its intramodular call graph generator 212 for this purpose. Referring now to FIG. 5, each intramodular call graph 222 includes information regarding all calls within a module, but calls across module boundaries are not represented or considered. Thus, when comparing module M1 in the global call graph 126 with module M1 in the intramodular call graph 222, we see that the calls among modules within module M1 are still present (namely, that M1.P1 calls M1.P2 16 times and that M 1.P2 calls M 1.P4 20 times). However, the calls across module boundaries (namely, from M1.P1 to M2.P1; from M1.P4 to M3.P2; from M1.P3 to M3.P1; and from M2.P2 to M1.P4) are not shown. Procedure reordering mechanism 220 thus operates on one module at a time to reorder the procedures within a selected module according to the profile data contained within the intramodular call graph 222 that corresponds to the selected module.

Profile data within global call graph 126 may also be used to generate intermodular call graph 234 of FIG. 6 (step 340). Call graph partitioner 210 uses its intermodular call graph generator 214 for this purpose. Intermodular call graph 234 represents all the calls between modules in global call graph 126, but calls entirely within each module are not represented. Thus, the call from M1.P1 to M2.P1 with a weight of 20 in global call graph 126 is represented in intermodular call graph 234 of FIG. 6 as an arc of weight 20 from M1 to M2. The call from M2.P2 to M1.P4 with a weight of 10 in global call graph 126 of FIG. 6 is represented by an arc of weight 10 from M2 to M1. Similarly, the call from M3.P2 to M2.P2 with a weight of 20 in global call graph 126 is represented in intermodular call graph 234 by an arc of weight 20 from M3 to M2. Note, however, that multiple arcs in the same direction between modules in the global call graph 126 are combined into one arc in the intermodular call graph 234. For example, the call from M1.P3 to M3.P1 with a weight of 50 is combined with the call from M1.P4 to M3.P2 with a weight of 100 to result in a single arc from M1 to M3 with a weight of 150. Once intermodular call graph 234 has been generated, module reordering mechanism 230 uses the profile data contained in intermodular call graph 234 to reorder the modules (step 350).

The global call graph 126 of FIG. 4, the intramodular call graphs 222 of FIG. 5, and the intermodular call graph 234 of FIG. 6 are shown to illustrate the general concepts of the invention. This specific example shows how the global call graph 126 may be easily partitioned into several intramodular call graphs 222 and one intermodular call graph 234. Those skilled in the art will recognize that many variations may be made within the scope of the invention. For example, each module could be further divided down into groups of procedures. In addition, different intermodular call graphs could be generated for different groups of modules. While the call graphs of FIGS. 4–6 are shown as directed call graphs, reordering using undirected call graphs is also within the scope of the invention. The present invention expressly encompasses any and all reordering of program portions within a computer program, regardless of the level of granularity.

The apparatus and methods disclosed herein provide a way to reorder portions of a computer program on a modular basis, thereby achieving enhanced performance through procedure reordering within modules and through module reordering while providing enhanced maintainability of the computer program by restricting procedure reordering to reordering within module boundaries. In this manner, the computer program may be easily maintained by replacing entire modules without adversely affecting the operation of modules in the computer program that do not change.

While the invention has been particularly shown and described with reference to preferred embodiments thereof, it will be understood by those skilled in the art that various changes in form and details may be made therein without departing from the spirit and scope of the invention.

We claim:

1. An apparatus comprising:
   at least one processor;
   a memory coupled to the at least one processor;
   a computer program residing in the memory, the computer program including at least one procedure within each of a plurality of modules;
   profile data residing in the memory that represents the execution frequency of at least one procedure within at least one of the plurality of modules in the computer program;
   a reordering mechanism residing in the memory and executed by the at least one processor, the reordering mechanism reordering a plurality of procedures within at least one of the plurality of modules based on a portion of the profile data corresponding to the plurality of procedures and reordering the plurality of modules based on a portion of the profile data corresponding to procedures within the plurality of modules.

2. The apparatus of claim 1 wherein the profile data comprises a global call graph for the computer program.

3. The apparatus of claim 1 wherein the reordering mechanism comprises a call graph partitioner for generating at least one intramodular call graph from the profile data and for generating at least one intermodular call graph from the profile data.

4. The apparatus of claim 3 wherein the reordering mechanism comprises a procedure reordering mechanism that reorders the plurality of procedures within a selected one of the plurality of modules based on the profile data in the intramodular call graph that corresponds to the selected module.

5. The apparatus of claim 3 wherein the reordering mechanism comprises a module reordering mechanism that reorders the plurality of modules based on the profile data in the intermodular call graph.

6. An apparatus comprising:
   at least one processor;
   a memory coupled to the at least one processor;
   a computer program residing in the memory, the computer program including at least one procedure within each of a plurality of modules;
   profile data residing in the memory that represents the execution frequency of at least one procedure within at least one of the plurality of modules in the computer program;
   a reordering mechanism residing in the memory and executed by the at least one processor, the reordering mechanism generating an intramodular call graph from the profile data for a selected one of the plurality of modules in the computer program and reordering the procedures within the selected module based on the profile data within the intramodular call graph.

7. The apparatus of claim 6 wherein the profile data comprises a global call graph for the computer program.

8. The apparatus of claim 6 wherein the reordering mechanism further generates an intermodular call graph from the profile data and reorders the plurality of modules based on the profile data within the intermodular call graph.

9. An apparatus comprising:
   at least one processor;
   a memory coupled to the at least one processor;
   a computer program residing in the memory, the computer program including at least one procedure within each of a plurality of modules;
   profile data residing in the memory that represents the execution frequency of at least one procedure within at least one of the plurality of modules in the computer program;
   a reordering mechanism residing in the memory and executed by the at least one processor, the reordering mechanism generating an intermodular call graph from the profile data and reordering the plurality of modules based on the profile data within the intermodular call graph.

10. The apparatus of claim 9 wherein the profile data comprises a global call graph for the computer program.

11. An apparatus comprising:
    at least one processor;
    a memory coupled to the at least one processor;
    a computer program residing in the memory, the computer program including at least one procedure within each of a plurality of modules;
    a global call graph residing in the memory that represents the execution frequency of a plurality of procedures within at least one of the plurality of modules in the computer program;
    a reordering mechanism residing in the memory and executed by the at least one processor, the reordering mechanism comprising:
      a call graph partitioner, the call graph partitioner generating an intramodular call graph and an intermodular call graph from the global call graph;
      a procedure reordering mechanism, the procedure reordering mechanism reordering the plurality of procedures within a selected one of the plurality of modules based on profile data in the intramodular call graph that corresponds to the selected module; and
      a module reordering mechanism, the module reordering mechanism reordering the plurality of modules based on profile data within the intermodular call graph.

12. A method for improving execution speed of a computer program on a computer apparatus by reordering procedures and modules in the computer program according to profile data that represents the execution frequency of at least one procedure within at least one of a plurality of modules in the computer program, the computer program including at least one procedure within each of the plurality of modules, the method comprising the steps of:
    reordering a plurality of procedures within at least one of the plurality of modules based on a portion of the profile data corresponding to the plurality of procedures; and
    reordering the plurality of modules based on a portion of the profile data corresponding to procedures within the plurality of modules.

13. The method of claim 12 wherein the step of reordering the plurality of procedures within at least one of the plurality of modules comprises the steps of:

generating an intramodular call graph from the profile data for a selected one of the plurality of modules in the computer program; and reordering the procedures within the selected module based on the profile data within the intramodular call graph.

14. The method of claim 13 wherein the step of generating the intramodular call graph comprises the steps of:

generating a global call graph for the computer program from the profile data, the global call graph containing the plurality of modules that each contain at least one procedure; and removing arcs in the global call graph that cross the boundaries of the selected module.

15. The method of claim 12 wherein the step of reordering the plurality of modules comprises the steps of:

generating an intermodular call graph from the profile data; and reordering the plurality of modules based on the profile data within the intermodular call graph.

16. The method of claim 15 wherein the step of generating the intermodular call graph comprises the steps of:

generating a global call graph for the computer program from the profile data, the global call graph containing the plurality of modules that each contain at least one procedure;

removing the procedures within the modules of the global call graph;

retaining the arcs between modules; and combining multiple arcs that span from a first module to a second module into a single arc with a weight equal to the sum of the weights of the multiple arcs.

17. The method of claim 12 further comprising the step of generating a global call graph from the profile data.

18. A method for improving execution speed of a computer program on a computer apparatus by reordering procedures in the computer program according to profile data that represents the execution frequency of at least one procedure within at least one of a plurality of modules in the computer program, the computer program including at least one procedure within each of the plurality of modules, the method comprising the steps of:

generating an intramodular call graph from the profile data for a selected one of the plurality of modules in the computer program; and reordering the procedures within the selected module based on the profile data within the intramodular call graph.

19. The method of claim 18 wherein the step of generating the intramodular call graph comprises the steps of:

generating a global call graph for the computer program from the profile data, the global call graph containing the plurality of modules that each contain at least one procedure; and removing arcs in the global call graph that cross the boundaries of the selected module.

20. The method of claim 18 further comprising the steps of:

generating an intermodular call graph from the profile data; and reordering the plurality of modules based on the profile data within the intermodular call graph.

21. The method of claim 20 wherein the step of generating the intermodular call graph comprises the steps of:

generating a global call graph for the computer program from the profile data, the global call graph containing the plurality of modules that each contain at least one procedure;

removing the procedures within the modules of the global call graph;

retaining the arcs between modules; and combining multiple arcs that span from a first module to a second module into a single arc with a weight equal to the sum of the weights of the multiple arcs.

22. The method of claim 18 further comprising the step of generating a global call graph from the profile data.

23. A method for improving execution speed of a computer program on a computer apparatus by reordering procedures in the computer program according to profile data that represents the execution frequency of at least one procedure within at least one of a plurality of modules in the computer program, the computer program including at least one procedure within each of the plurality of modules, the method comprising the steps of:

generating an intermodular call graph from the profile data; and reordering the plurality of modules based on the profile data within the intermodular call graph.

24. The method of claim 23 wherein the step of generating the intermodular call graph comprises the steps of:

generating a global call graph for the computer program from the profile data, the global call graph containing the plurality of modules that each contain at least one procedure;

removing the procedures within the modules of the global call graph;

retaining the arcs between modules; and combining multiple arcs that span from a first module to a second module into a single arc with a weight equal to the sum of the weights of the multiple arcs.

25. The method of claim 23 further comprising the step of generating a global call graph from the profile data.

26. A method for improving execution speed of a computer program on a computer apparatus by reordering procedures and modules in the computer program according to profile data, the computer program including at least one procedure within each of the plurality of modules, the method comprising the steps of:

generating a global call graph for the computer program from the profile data;

generating an intramodular call graph from the global call graph for each of the plurality of modules in the computer program;

reordering the procedures within each of the plurality of modules based on profile data within the corresponding intramodular call graph;

generating an intermodular call graph from the global call graph; and reordering the plurality of modules based on profile data within the intermodular call graph.

27. A program product comprising:

(A) a reordering mechanism that reorders a plurality of procedures within at least one of a plurality of modules in a computer program based on profile data corresponding to the plurality of procedures and that reorders the plurality of modules based on profile data corresponding to procedures within the plurality of modules; and (B) signal bearing media bearing the reordering mechanism.

28. The program product of claim 27 wherein the signal bearing media comprises recordable media.

29. The program product of claim 27 wherein the signal bearing media comprises transmission media.

30. The program product of claim 27 wherein the profile data comprises a global call graph for the computer program.

31. The program product of claim 27 wherein the reordering mechanism comprises a call graph partitioner for generating at least one intramodular call graph from the profile data and for generating at least one intermodular call graph from the profile data.

32. The program product of claim 31 wherein the reordering mechanism comprises a procedure reordering mechanism that reorders the plurality of procedures within a selected one of the plurality of modules based on the profile data in the intramodular call graph that corresponds to the selected module.

33. The program product of claim 31 wherein the reordering mechanism comprises a module reordering mechanism that reorders the plurality of modules based on the profile data in the intermodular call graph.

34. A program product comprising:

(A) a reordering mechanism that generates an intramodular call graph from profile data for a selected one of the plurality of modules in a computer program and that reorders the procedures within the selected module based on the profile data within the intramodular call graph; and (B) signal bearing media bearing the reordering mechanism.

35. The program product of claim 34 wherein the signal bearing media comprises recordable media.

36. The program product of claim 34 wherein the signal bearing media comprises transmission media.

37. The program product of claim 34 wherein the profile data comprises a global call graph for the computer program.

38. The program product of claim 34 wherein the reordering mechanism generates an intermodular call graph from the profile data and reorders the plurality of modules based on the profile data within the intermodular call graph.

39. A program product comprising:

(A) a reordering mechanism for generating an intermodular call graph from profile data relating to a computer program, the reordering mechanism reordering a plurality of modules within a computer program based on the profile data within the intermodular call graph; and (B) signal bearing media bearing the reordering mechanism.

40. The program product of claim 39 wherein the signal bearing media comprises recordable media.

41. The program product of claim 39 wherein the signal bearing media comprises transmission media.

42. The apparatus of claim 39 wherein the profile data comprises a global call graph for the computer program.

* * * * *